3,445,318
ADHESIVE COMPOSITION OF ETHYLENE-PROPYLENE COPOLYMERS AND TERPOLYMERS WITH CARBON BLACK PARTICLES
Stewart L. Brams, West Alexandria, Frederick W. Gage, Dayton, and Ronald L. Riege, West Alexandria, Ohio, assignors, by mesne assignments, to Whittaker Corporation, Los Angeles, Calif., a corporation of California
Filed Feb. 7, 1964, Ser. No. 343,239
Int. Cl. B32b 27/32, 27/08, 15/08
U.S. Cl. 161—46                                    6 Claims

ABSTRACT OF THE DISCLOSURE

This invention relates to an adhesive composition or system for bonding ethylene-propylene elastomers to a variety of rigid and flexible substrates comprising a substantial weight proportion of an ethylene-propylene elastomeric material and a substantial proportion by weight (but more significantly by surface area) of a carbon black of very small particle size within the range of from nine to thirty-five millimicrons in diameter.

---

This invention relates to an adhesive or bonding system for joining the polymers, copolymers and terpolymers of ethylene-propylene or elastomers containing the same to a variety of rigid and flexible substrates. More particularly, the invention relates to a new composition of matter which is a particularly effective adhesive for use in combination with the ethylene-propylene materials and to the adhered structures and assemblies thus utilizing the same.

Background of the invention

For many years the rubber and plastics industry has been developing new and improved synthetic polymeric materials, many of which have elastomeric or rubber-like properties and are often referred to as synthetic rubbers. Included among these are the various well-known materials such as the butadiene-styrene copolymers, the butadiene nitrile copolymers, the polychloroprenes, the acrylates, etc., all of which possess general rubber-like properties and each of which also seem to have special characteristics such as good oil resistance, high abrasion resistance, adhesive tendencies toward other synthetic rubbers or metals or the like. All of the known and previously used synthetic rubbers however, like natural rubber after which they were patterned, are characterized by a disturbing tendency to haze or crack after relatively limited exposure to ultraviolet radiation or ozone-containing environments such as are encountered in atmospheric exposure, particularly in sunlight.

In view of the manner in which the prior art has developed specific synthetic compositions to provide specific properties, it is not surprising that in very recent years, polymeric elastomers have been developed which exhibit a high degree of resistance to deterioration upon exposure to ultraviolet radiation and/or to ozone. These new elastomers comprise ethylene-propylene, either in the form of copolymers of ethylene and propylene (sometimes referred to as ethylene-propylene rubber or the abbreviation, "EPR") or in the form of terpolymers of an ethylene-propylene copolymer and a nonconjugated diene such as dicyclopentadiene, 2-methylenenorbornene, 11-ethyl-1,11-tridecadiene, and 6-methyl-1,5-heptadiene (such terpolymers being generally referred to as ethylene-propylene terpolymers or the abbreviation, "EPT"). Since both the EPR and the EPT materials possess all of the important properties expected of and required in elastomers, as well as the improved weathering ability provided by the ozone and ultraviolet radiation resistance for which they are unique, their commercial success would seem to be assured except for one outstanding and quite significant detail; viz, the hitherto unsolved problem of bonding these ethylene-propylene materials to various rigid and flexible substrates, particularly metal. Because almost all modern-day uses of the rubber-like elastomers require some such bonding, it follows that the improvements otherwise available from the development of EPR and EPT compounds could not be fully utilized or enjoyed until economical, sound and reliable bonding systems were developed therefor.

It is accordingly an object of this invention to provide an adhesive for ethylene-propylene compounds.

A more specific object of the invention is to provide such an adhesive for joining ethylene-propylene copolymers or terpolymers to a wide variety of substrates ranging from rigid metals to flexible fabrics.

Still another object of the invention is to provide such an adhesive in the form of a coating or film-forming composition which may be conveniently applied to the various substrates.

Still another object of the present invention is to provide such an adhesive composition which will have a bond strength comparable in magnitude to the tear strength of the rubber-like materials to be adhered thereby.

Yet another object of the present invention is to provide an adhered structure or assembly of an ethylene-propylene component and a rigid or flexible substrate.

It is yet another object of the invention to provide a bonding agent for the ethylene-propylene rubbers which will give good performance over a wide curing range and withstand high-temperature service conditions.

Yet another object of this invention is to provide an elastomer bonding agent including as a major ingredient an ethylene-propylene synthetic rubber which will offer resistance to ozone deterioration and ultraviolet radiation degradation.

The achievement of these and other objects and advantages will be apparent from a reading of the following disclosure.

The present invention provides an adhesive composition comprising a substantial weight proportion of an ethylene-propylene copolymer or terpolymer and a substantial proportion by weight (but perhaps more significantly by surface area) of a carbon black of very small particle size admixed therewith and uniformly dispersed therethrough. This mixture, carried by a suitable solvent to provide film-forming or coating characteristics, may be further modified by the incorporation therewith of a substantial proportion of one or more of the group of related rubber-like polymeric materials consisting of polybutadiene, butyl rubber, butadiene-styrene copolymers, polypropylene oxides and even natural rubber. A third principal ingredient which may also be added to the ethylene-propylene compound in further modification of its properties has been found to be a halogen-containing substance consisting of polychlorinated polyphenyl and chlorinated paraffin wax.

While some variation is allowable because of the inter-relationship between particle size and surface area provided, it has been found that the carbon black of relatively small particle size should be incorporated with the ethylene-propylene compounds in much larger quantities or ratios than has heretofore been considered necessary or desirable for related carbon black applications. More specifically, experimentation has shown that best results can be achieved in compounds in which the carbon black having a particle size on the order of 13 millimicrons is incorporated in quantities greater than 65 percent and preferably on the order of 130 percent by weight of the total of the rubber-like materials (i.e., the ethylene-propylene compounds and any other rubber-like polymers incorporated therewith).

While even small amounts of these other rubber-like materials have been found to provide an improved adhesive from the standpoint of ease of processability, bond strength and the like, it has been found that the best results are achieved in compounds in which the rubber-like materials are incorporated in a weight ratio within the range of from approximately 25 parts to 75 parts of the other rubber-like material to from 75 to 25 parts of the ethylene-proylene material. Moreover, it has been found that if the ratio of the ethylene-propylene and the related elastomeric polymer is such that the ethylene-propylene compound comprises less than 25 percent of the total elastomeric material present in the adhesive, less efficient bonding systems will result.

Similarly it has been found that, while even a small amount of the halogen-containing substance will provide an improved bonding agent, the polychlorinated polyphenyl or the chlorinated paraffin wax is most preferably incorporated in a weight ratio of approximately one to one, based upon the total elastomeric polymer including the ethylene-propylene and/or any other elastomeric polymer that is used on conjunction therewith. Larger proportions of the chlorinated material have, however, been found not to impair the adhesive capabilities of the composition. It has also been found that if a substantial quantity of the chlorinated waxy substance is thus employed, the improved adhesive results of the present invention may be achieved even with a slightly lower percentage of the carbon black being present in the total adhesive composition.

In the manufacture of adhesives according to this invention, the elastomeric polymers; i.e. the ethylene-propylene compounds, along with any polybutadiene or other elastomeric materials to be used in conjunction therewith, are admixed according to conventional rubber practice on a rubber mill or in an internal mixer, such as a Banbury mixer, subsequent to which they are sheeted off into thin films and cut into strips an inch or so in width to facilitate subsequent mixing.

The carbon black of the type above described and the chlorinated material, if any, may then be admixed with the elastomeric material in conventional mixing devices, such as a ball mill or on a heavy-duty dough mixer of the Baker-Perkins type. Also, it has been found helpful in many cases in which the extremely finely divided carbon black is to be incorporated in the large percentages required by the present invention to add this carbon black in small increments along with intermittent injections of a suitable solvent while allowing the mixing to continue until the ingredients, including any incidental compounding ingredients such as sulfur, conventional accelerators, plasticizers, anti-oxidants, synthetic resins and the like, to be employed, are uniformly dispersed throughout the mixture. If, by the time this uniform dispersion has been achieved, the adhesive composition has still not reached the desired viscosity at which it is to be stored and/or subsequently applied in the bonding applications, additional amounts of a suitable solvent may be added.

The invention thus generally described may be more clearly understood by reference to the following detailed descriptions of certain specific compositions and to the appended drawings.

Figure 1:
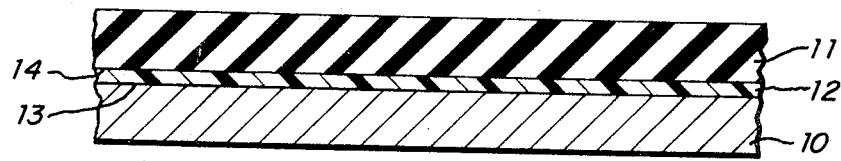
FIGURE 1 is a cross-sectional diagrammatic type of view of an ethylene-propylene rubber-to-metal assembly incorporating an adhesive according to this invention.

A typical bonded rubber-to-metal assembly incorporating the features of this invention is illustrated in FIGURE 1 wherein a rubber-like component, shown in the form of a layer 11, is bonded to a metal substrate, herein represented by a layer or substrate 10. The bonding is effected by the interposition of an adhesive or bonding layer 12 comprising one or more adhesive and/or bonding coats between a surface 13 of the substrate 10 and a surface 14 of the rubber layer 11. As explained above, the present invention is particularly adaptable to those situations wherein the rubber-like material of the layer 11 is an ethylene-propylene elastomer of the EPR or EPT variety. However, the adhesive layer 12, compounded as herein described, is also capable of providing a satisfactory bond between a typical substrate such as the metal layer 10 and many of the well-known synthetic rubbers and natural rubber itself.

While the bonding layer 12 may be composed as generally described above, a particularly satisfactory adhesive which has been utilized with great success is made according to the following recipe:

| | Grams |
|---|---|
| EPT rubber | 127.5 |
| Polybutadiene | 42.5 |
| Channel-type carbon black (particle size of 13 millimicrons) | 215.0 |
| Arochlor 5460 (a chlorinated triphenyl resin having an average chlorine content of 60% by weight manufactured and sold under that brand name by the Monsanto Chemical Co., St. Louis, Mo.) | 103.8 |
| Chlorowax 70 (a chlorinated paraffin containing approximately 70% chlorine by weight and having the general chemical formula $C_{24}H_{29}Cl_{21}$, manufactured and sold under that trade designation by Diamond Alkali Company, Cleveland, Ohio) | 34.5 |

The above ingredients may be suitably admixed by first combining the EPT rubber and the polybutadiene (representing the total elastomer) on a conventional rubber mill and sheeting off the mixture into a thin film and in strips thereof an inch or so in width. This mixture of the total elastomer is then placed in a mixer, such as a Baker-Perkins type mixer; then the carbon black and a suitable solvent such as a mixture of substantially equal parts by volume of a mixture of 20% by volume of xylene and 80% by volume of a high flash naphtha and a commercial heptane are added in small increments until all of the black is thoroughly admixed with the elastomers. The chlorinated paraffin and triphenyl substances may then be added along with sufficient additional solvent of the same or a compatible type until the degree of viscosity at which it is desired to store and/or subsequently to apply the vulcanizable bonding film is achieved.

By way of demonstrating the improvements in adhesion provided by the present invention, a layer of EPT rubber to comprise the layer 11 or its equivalent was prepared according to the following:

| | Parts by weight |
|---|---|
| Nordel 1070 (an ethylene-propylene-nonconjugated diene terpolymer manufactured and sold under that designation by E. I du Pont de Nemours & Co., Wilmington, Del.) | 100 |
| Zinc oxide | 5.0 |
| Stearic acid | 1.0 |
| HAF carbon black | 80 |
| Petroleum oil | 40.0 |
| Sulphur | 1.5 |
| Tetramethyl thiuram monosulfide | 1.5 |
| Mercaptobenzothiazole | 0.5 |

To test the effectiveness of an adhesive layer 12 for bonding an EPT compound made according to the above recipe to a metal part or substrate 10, suitable metal test pieces were carefully degreased and gritblasted after which a coat of a metal primer such as XD-8822, which is a vulcanizing-type rubber-to-metal bonding agent manufactured and sold under that designation by Dayton Chemical Products Laboratories, Inc., West Alexandria, Ohio, was applied. In lieu of a prime coat, the surface 13 of the substrate 10 may be brass plated. Once the surface 13 has been thus prepared, a cover coat in the form of a layer 12 composed as above described was spread on by a brush or a doctor blade. The EPT layer 11 was then pressed against the adhesive-coated metal layer 10 and the assembly subjected to curing conditions at a temperature of 320 degrees Fahrenheit for 35 minutes. Upon testing by tension pull similar to ASTM D–429–58 Method A, values in excess of 750 pounds per square inch were obtained before separation. Similar EPT-metal assemblies, bonded with the same adhesive layer 12, subjected to curing at 320 degrees Fahrenheit for 30 minutes and tested in a manner similar to the ASTM D–429–58 Method B produced values of 130 pounds per linear inch before separation.

By way of comparison, an EPT rubber layer 11, compounded as above described, was affixed to a metal layer by a conventional adhesive in the form of a solution of chlorinated rubber and red lead in xylene as disclosed for example in "Rubber to Metal Bonding" by S. Buchan, 2nd edition (1959) published by Palmerton Publishing Co., New York, N.Y. pages 182 through 183. Subjection of this assembly to vulcanizing conditions of 320 degrees Fahrenheit for 30 minutes and subsequent testing by the ASTM Method B as set forth resulted in a value of only 10 pounds per linear inch.

Demonstrating the fact that the mere use of an EPT rubber with the conventional adhesive composition does not yield substantial improvement, an EPT rubber compound identical to the above described Nordel 1070 recipe was placed in solution and applied as a second coat to a first coat of the chlorinated rubber and red lead in xylene. The test specimen was then cured and tested according to Method B, all in the same manner as the previous tests whereupon a bond strength of only 12 pounds per linear inch was achieved. Another test was made in a system in which the Nordel 1070 EPT rubber composition was replaced by the adhesive prepared according to the above adhesive recipe based upon 127.5 grams of the EPT rubber, 42.5 grams of polybutadiene, 215 grams of the 13 millimicron particle size carbon black, and 138.3 grams of chlorinated triphenyl and paraffin. This system was cured and tested and bond strength values of up to 140 pounds per linear inch were obtained.

Tests with other widely used rubber-to-metal adhesives and metal primers only slightly improved the results achieved by the use of the conventional chlorinated rubber and red lead mixture in xylene and fell far short of the bond strengths made possible by the adhesive of this invention.

Tests were also made of an adhesive in which the proportion of the 13 millimicron size carbon black was varied in the recipe of the above example of this invention with the absence of a halogen-containing substance. The resulting adhesives were prepared, applied, vulcanized and tested according to the above procedures, and the following results were achieved: When the weight ratio of the carbon black to the total elastomer (i.e., to the EPT rubber and the polybutadiene mixture) was 65 percent, a value of 50 pounds per linear inch was obtained. When the carbon black percentage was to 79 percent, 65 pounds per linear inch resulted; while a percentage of 107 tested 64 pounds per linear inch, of 150 percent tested 80 pounds per linear inch and of 178 percent tested 43 pounds per linear inch. It can be seen from these results that, while the carbon black percentages within the range of from 65 percent to 178 percent produce a stronger bond than any of the prior art adhesives, the degree of improvement lessens as the weight ratio varies substantially from 150 percent.

While proportions of carbon black less than 65 percent weight ratio result in substantial diminution of the bond strength, it has been found that adhesives with practical value and showing some degree of improvement over the prior art can be achieved by increasing the weight ratio of the carbon black to the total elastomer in the adhesive up to 300 percent.

Similar tests involving variations in the particle size of the carbon black have shown that this size also is critical to the improved bonding strengths provided by the teachings herein. These experiments have demonstrated that the improvements gained hereby become substantially less significant in mixtures in which the carbon black particles exceed 35 millimicrons in diameter. This is true even though the optimum surface area of the carbon black is sought to be maintained by substantially increasing the proportions thereof beyond the 300 percent weight ratio above-mentioned. On the other hand, no significant diminution in bond strength has been experienced in mixtures in which the particle size is reduced below the 13 millimicrons diameter. Channel-type carbon blacks having particle sizes as low as 9 millimicrons in diameter have been successfully used to yield bond strengths on the order of 100 pounds per linear inch under the Method B test as set forth above.

In mixtures in which these smaller particles are employed, it has been found that the weight ratio of the carbon black to the total elastomer in the adhesive composition may be reduced from the otherwise optimum quantities.

Other variations of the above recipe for a preferred adhesive composition according to this invention include changing the weight proportions of the ethylene-propylene material relative to the polybutadiene. When adhesives incorporating these variations were cured and tested in the same manner as the above specimens, it was found that substantial improvements in bond strengths over the prior art adhesives were obtained in those compositions wherein from 25 to 75 parts by weight of the ethylene-propylene material were incorporated with from 75 to 25 parts by weight of the polybutadiene or of a related elastomeric material such as natural rubber, butyl rubber, a butadiene-styrene copolymer or a polypropylene oxide. In all such cases, however, the strength of the bond was substantially reduced when the ethylene-propylene rubber constituted less than one-fourth of the total weight of the mixture of elastomeric materials, i.e., of the EPT rubber and the polybutadiene or its substitute.

Figure 2:
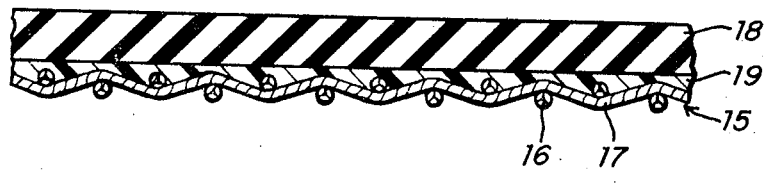
FIGURE 2 is a cross-sectional diagrammatic type of view of an ethylene-propylene rubber coated fabric utilizing an adhesive according to this invention.

The adhesive of this invention was also utilized to bond rubber and, particularly, the ethylene-propylene rubbers to a flexible substrate such as a fabric. This was done in the manner illustrated in FIGURE 2. A conventional cross-woven fabric layer 15, for example a double cross weave fabric with cross threads or yarns 16 and warp threads 17 of polyester material, was treated by immersion in or was spray-coated with a thin surface application of a primer, such as Thixon XQ–774, which is a vulcanizing-type bonding agent, manufactured and sold under that proprietary named by Dayton Chemical Products Laboratories, Inc., West Alexandria, Ohio. Then a thin layer 19 of the adhesive was applied to the fabric layer 15 by dipping or by a doctor blade application.

An elastomeric layer 18 of EPT or EPR or related ethylene-propylene-containing rubber-like material was then impressed upon the treated fabric surface and the assembly subjected to vulcanizing conditions of 320 degrees Fahrenheit for 20 minutes. When the bonded elastomer-fabric assembly was subjected to a typical stripping test for bond strength under a pull at the rate of two inches per minute, a reading of 29.5 pounds per linear inch was achieved.

By way of isolating the influence of the adhesive upon these bond strengths which were considerably greater than have been heretofore achievable, tests of similarly prepared specimens involving the Thixon XQ–774 primer yielded results of only 8 pounds per linear inch under the same stripping test.

We claim:

1. An adhesive composition comprising an ethylene-propylene-containing elastomeric material and carbon black, the particles of carbon black being within the range of from 9 to 35 millimicrons in diameter, wherein the weight proportion of the carbon black is within the range of from 65 to 300 parts to 100 parts of the ethylene-propylene-containing elastomeric material.

2. An adhesive composition according to claim 1 wherein the average diameter of the carbon black particles is 13 millimicrons and the proportion thereof is on the order of 130 parts by weight to 100 parts by weight of the ethylene-propylene-containing elastomeric material.

3. An adhesive composition according to claim 1 wherein said ethylene-propylene-containing elastomeric material is at least one of that class of ethylene-propylene materials which consists of ethylene-propylene copolymers and ethylene-propylene terpolymers.

4. An adhesive composition according to claim 3 wherein the ethylene-propylene-containing elastomeric material comprises also an admixture therewith of at least one of that class of related elastomeric materials which consists of polybutadiene, natural rubber, butyl rubber, butadiene-styrene copolymers and polypropylene oxides wherein said related elastomeric material is present in a weight ratio of from 25 to 75 parts by weight of the related elastomeric material to from 75 to 25 parts by weight of the ethylene-propylene material.

5. An adhesive composition to be applied as a film or coating to a variety of substrates and particularly adapted for the bonding to such substrates of ethylene-propylene copolymers and terpolymers which comprises an ethylene-propylene-containing elastomeric material, carbon black, the particle size of which is within the range of from 9 to 35 millimicrons in diameter and a halogen-containing substance of the class consisting of polychlorinated polyphenyl and chlorinated paraffin wax, wherein the weight ratio of the carbon black is within the range of from 65 to 300 parts to 100 parts of the ethylene-propylene-containing elastomeric material and the weight ratio of said halogen-containing substance is approximately one part to one part of the ethylene-propylene-containing elastomeric material.

6. A bonded assembly comprising an ethylene-propylene-containing rubber-like component, a substrate presenting an interface opposed to and coextensive with an interface of said component and a vulcanized adhesive film between and in adhered contact with said interfaces which latter comprises an adhesive composition including an ethylene-propylene-containing elastomeric material, carbon black, the particle size of which is within the range of from 9 to 35 millimicrons in diameter and a halogen-containing substance of the class consisting of polychlorinated polyphenyl and chlorinated paraffin wax, wherein the weight ratio of the carbon black is within the range of from 65 to 300 parts to 100 parts of the ethylene-propylene-containing elastomeric material and the weight ratio of said halogen-containing substance is approximately one part to one part of the ethylene-propylene-containing elastomeric material.

References Cited

UNITED STATES PATENTS

| | | | |
|---|---|---|---|
| 3,200,174 | 8/1965 | Adamek | 260—889 |
| 3,136,739 | 6/1964 | Adamek | 260—889 |
| 3,264,240 | 8/1966 | Segura | 260—41 |
| 2,467,322 | 4/1949 | Lightbown | 156—306 |

OTHER REFERENCES

Diamond Alkali Publication, Chlorinated Paraffins, 1956, publ., pp. 8–10.

ROBERT F. BURNETT, *Primary Examiner.*

M. A. LITMAN, *Assistant Examiner.*

U.S. Cl. X.R.

161—87, 89, 217, 234, 247, 253; 260—41, 41.5